United States Patent
Galic (10) Patent No.: US 11,108,318 B2
(45) Date of Patent: Aug. 31, 2021

(54) METHOD FOR CONTROLLING A LINE CONVERTER ON BOARD A TRACK-BOUND VEHICLE

(71) Applicant: Bombardier Transportation GmbH, Berlin (DE)

(72) Inventor: Johann Galic, Surahammar (SE)

(73) Assignee: Bombardier Transportation GmbH, Berlin (DE)

( * ) Notice: Subject to any disclaimer, the term of this patent is extended or adjusted under 35 U.S.C. 154(b) by 328 days.

(21) Appl. No.: 15/764,378

(22) PCT Filed: Oct. 27, 2016

(86) PCT No.: PCT/EP2016/075986
§ 371 (c)(1),
(2) Date: Mar. 29, 2018

(87) PCT Pub. No.: WO2017/076751
PCT Pub. Date: May 11, 2017

(65) Prior Publication Data
US 2018/0309356 A1 Oct. 25, 2018

(30) Foreign Application Priority Data

Nov. 2, 2015 (EP) .................................... 15192487

(51) Int. Cl.
*H02M 1/12* (2006.01)
*B60L 9/00* (2019.01)
(Continued)

(52) U.S. Cl.
CPC ................ *H02M 1/12* (2013.01); *B60L 9/00* (2013.01); *B60L 9/24* (2013.01); *B60M 1/30* (2013.01);
(Continued)

(58) Field of Classification Search
CPC ...................................................... H02M 1/12
See application file for complete search history.

(56) References Cited

U.S. PATENT DOCUMENTS

| 2008/0036427 A1* | 2/2008 | Hiraki | B60L 9/24 320/166 |
| 2014/0056045 A1* | 2/2014 | Yan | H02M 1/4233 363/126 |
| 2016/0311426 A1* | 10/2016 | Sato | B60L 15/2045 |

FOREIGN PATENT DOCUMENTS

| WO | 91/03861 A1 | 3/1991 |
| WO | 2013/187883 A1 | 12/2013 |

OTHER PUBLICATIONS

Ghiara et al., "High Power Factor Control System in Multilevel Converters for AC Heavy Traction Drives," Electronics Conference and Exposition (APEC), IEEE, Mar. 11, 1990, pp. 672-680.
(Continued)

*Primary Examiner* — Daniel Kessie
(74) *Attorney, Agent, or Firm* — Dilworth & Barrese, LLP (57) ABSTRACT

In a method for controlling a line converter on board a track-bound vehicle semiconductor devices of current valves of the line converter are controlled to be turned on and off so as to prevent the current (I) through a secondary winding of a transformer to which midpoints of phase-legs of the converter are connected to pass zero and shift direction other when the voltage across the secondary winding shifts direction by a start of a new half period of an AC line voltage across the windings of the transformer.

12 Claims, 5 Drawing Sheets

(51) Int. Cl.
*H02M 7/5387* (2007.01)
*B60L 9/24* (2006.01)
*B60M 1/30* (2006.01)
*B61L 3/00* (2006.01)
*H02M 7/219* (2006.01)
*H02M 1/00* (2006.01)

(52) U.S. Cl.
CPC ............ *B61L 3/008* (2013.01); *H02M 7/219* (2013.01); *H02M 7/5387* (2013.01); *B60L 2200/26* (2013.01); *B60L 2210/20* (2013.01); *B60L 2210/30* (2013.01); *B60L 2240/12* (2013.01); *H02M 2001/0058* (2013.01); *Y02T 10/72* (2013.01)

(56) References Cited

OTHER PUBLICATIONS

Still et al., "Modularer IGBT-Hilfsbetriebeum-Richter Fur Triebfahrzuege," EB—Elektrische Bahnen, Div-Deutscher vol. 92, No. 11, Nov. 1, 1994, pp. 305-310.
Mohan et al., "Single-Phase Inverters," Power Electronics: converters, Dec. 31, 1995, John Wiley Y Sons Inc., pp. 211-217.

\* cited by examiner

METHOD FOR CONTROLLING A LINE CONVERTER ON BOARD A TRACK-BOUND VEHICLE

TECHNICAL FIELD OF THE INVENTION AND BACKGROUND ART

The present invention relates to a method for controlling a line converter on board a track-bound vehicle, said converter having the features listed in the preamble of appended claim 1.

Thus, the method is restricted to track-bound vehicles getting electric power from an AC supply line, but the track-bound vehicle, such as a rail vehicle, may be of any conceivable type. The invention is not restricted to any number of phases of the alternating voltage of said line, although single-phase and three-phase voltages are most common, neither is the invention restricted to any particular levels of such voltages or electric power to be fed through said line converter.

Figure 1:
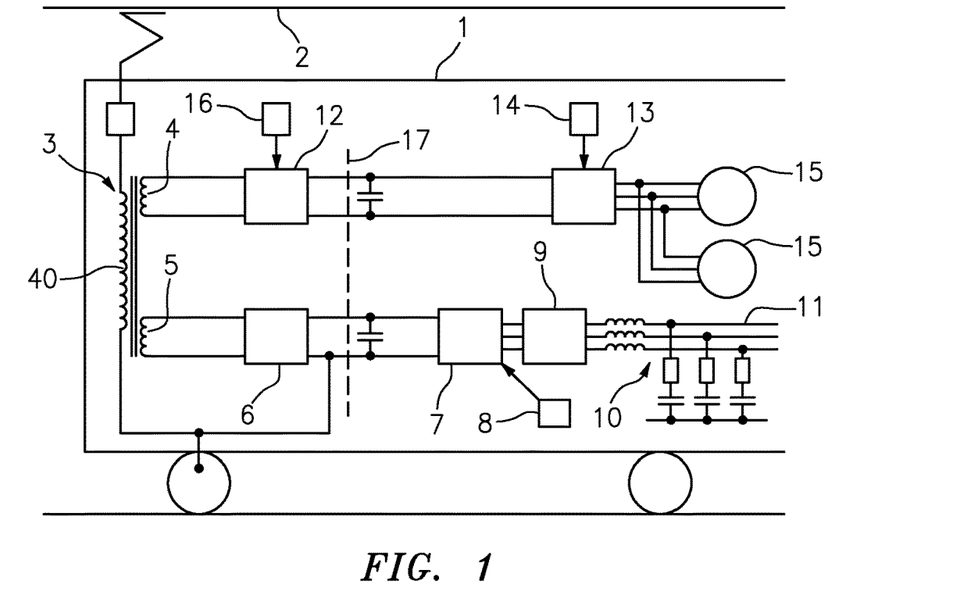
FIG. 1 is a very schematic view illustrating an electric system in which a line converter which may be controlled through a method according to the present invention is included.

FIG. 1 illustrates schematically how electric power may be fed to a track-bound vehicle 1 from an AC supply line 2 and used in said vehicle. The vehicle is configured to move along the AC supply line 2, which accordingly acts as an AC source and which may for example carry a one-phase alternating voltage of 15 kV and 16⅔ Hz (Sweden) and 25 kV and 50 Hz (Denmark). The vehicle has a transformer 3 for transforming the voltage from the supply line 2 to a suitable level. The transformer has here a primary winding 40 and two secondary windings 4, 5, one of which being connected to a line converter 6 for delivering a direct voltage of for example 1.5-3 kV on the output thereof. This direct voltage is delivered to an auxiliary converter 7, which is controlled by a control unit 8 for generating a train of pulses according to a Pulse Width Modulation pattern for delivering a three-phase alternating voltage on the output thereof. The output of the converter is connected to a three-phase transformer 9 as well as harmonic filters 10 for smoothing out the alternating voltage delivered by a distribution network 11 to sockets arranged in the track-bound vehicle, such as for connection of computers, and to lightening, heating and other appliances.

The other secondary winding 4 of the transformer is connected to a line converter 12 configured to deliver direct voltage on the output thereof to the input of a motor converter 13 controlled by a control unit 14 in a similar manner as the control carried out by the control unit 8 for delivering a three-phase alternating voltage on the output thereof to motors 15 in the form of electric machines, for driving the vehicle. The control unit 14 will receive orders from the driver of the vehicle for adapting the frequency of the voltage delivered by the stator windings of the motors to the vehicle speed being desired. In the case of braking the vehicle electric power will flow in the direction from the motors to the AC supply line 2 through the line converter 12 then controlled through a control unit 16 to deliver a single-phase alternating voltage on the output thereof. It is pointed out that this is only one of several possible appearances of an electric system in a track-bound vehicle to which a line converter belongs.

Figure 2:
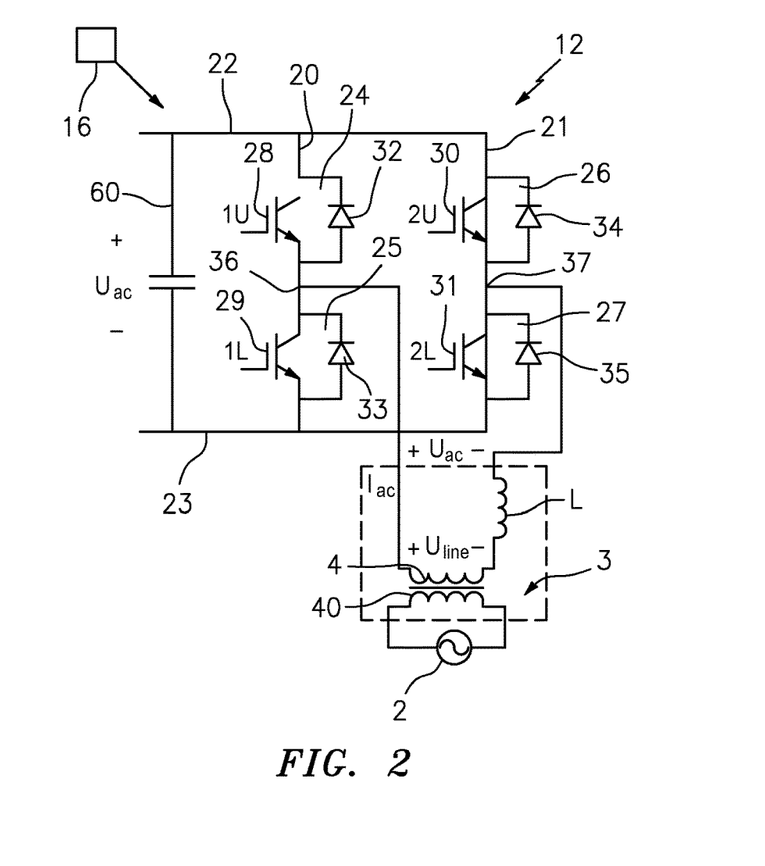
FIG. 2 is a schematic view of a said line converter.

FIG. 2 illustrates schematically an embodiment of a line converter 12, which here has one bridge with two phase-legs 20, 21 connected in parallel between opposite poles 22, 23 of a DC intermediate link 60 and having each two current valves 24-27 connected in series. Each current valve comprises a semiconductor device of turn-off type 28-31, such as an IGBT (Insulated Gate Bipolar Transistor), and a rectifying member 32-35, such as a diode, connected in anti-parallel therewith. A midpoint 36, 37 of each phase-leg 20, 21 dividing the phase-leg in two identical halves is connected to an opposite side of a secondary winding 4 of a transformer 3 with respect to a said midpoint of the other phase-leg. The transformer has an inductance L when measured from the secondary side. The primary winding 40 of the transformer 3 is connected to the AC supply line indicated at 2.

Figure 3A:
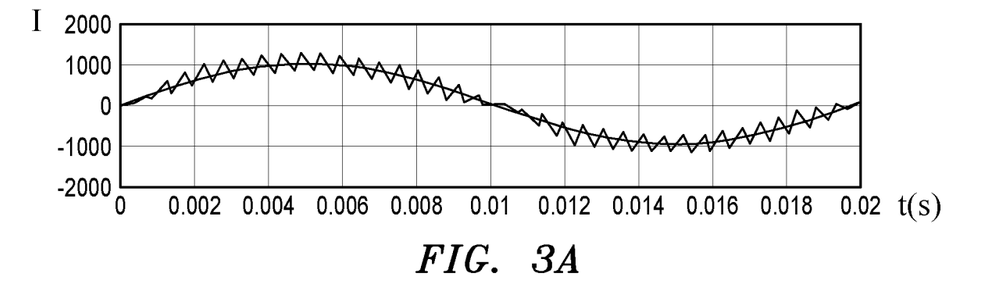
FIGS. 3a and 3b are graphs of the current versus time and current harmonics resulting therefrom versus frequency during a time period of the fundamental voltage when controlling a line converter as shown in FIG. 2 through a prior art Pulse Width Modulation scheme and at a comparatively high fundamental current value.
Figure 3B:
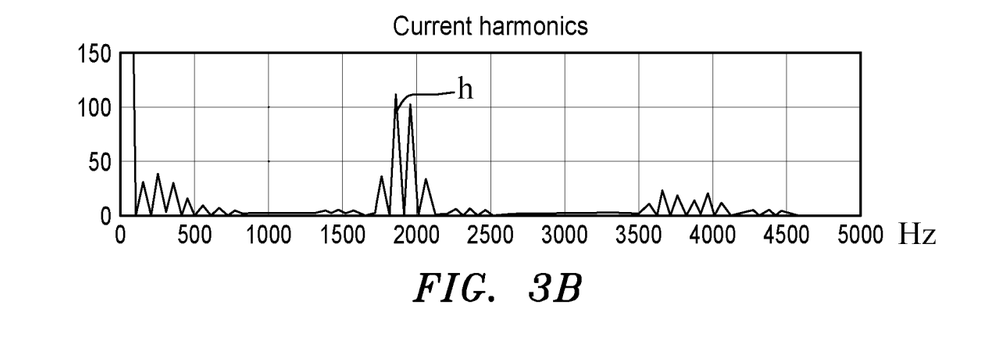

Such a line converter 12 is controlled through a control unit 16 normally through an ordinary Pulse Width Modulation pattern scheme, which results in a comparatively large current ripple as shown in FIG. 3, causing audible noise from the transformer and also high power losses. The main source of this audible noise is the current harmonics, illustrated in FIG. 3, which with an ordinary Pulse Width Modulation control will be substantially the same irrespectively of the magnitude of the fundamental current. The noise comes here especially from the second harmonic h of the switching frequency. Thus, this Pulse Width Modulation pattern control results in the same noise when the motors of the vehicle is idling as when they are driving at full load. This noise constitutes a particularly big problem when the track-bound vehicle stands still at a station where a lower degree of audible noise is accepted than at areas between stations.

SUMMARY OF THE INVENTION

The object of the present invention is to provide a method for controlling a line converter on board a track-bound vehicle addressing the problems of said noise resulting from the control of the line converter disclosed above.

This object is according to the invention obtained by providing such a method being characterized by controlling the semiconductor devices of the current valves to be turned on and off so as to prevent the current through the secondary winding of the transformer to pass zero and shift direction other than when the voltage across said primary winding shifts direction by a start of a new half period of the AC line voltage across the windings of the transformer.

Thus, this means that the current will be interrupted at low current, since the current ripple will then reach zero but may not change direction. This results in a total elimination of harmonics resulting from the current ripple in idling as when the vehicle stops at a station, and these harmonics are growing to be larger when the load is increased. This means that no disturbing noise will result from the switching at idling and a great reduction of the noise may be expected up to about 20% of full load current, which is the value that the current ripple will normally have when controlling a said line converter according to a Pulse Width Modulations pattern scheme. This will then also result in a reduction of power losses in the transformer and the line converter for lower loads.

According to an embodiment of the invention the method comprises a first control scheme according to which said semiconductor devices are controlled so that would a current through the secondary winding of the transformer having a certain direction reach zero it will remain zero until starting to flow in the same certain direction again during one and the same half period of said AC line voltage and accordingly be discontinuous.

According to another embodiment of the invention it is a line converter in the form of a two level converter that is controlled.

According to another embodiment of the invention constituting a further development of the embodiment last mentioned the control of said semiconductor devices of the line converter is carried out according to said first control scheme only when the electric power transferred from the AC supply line to said vehicle through the transformer is below a predetermined level, such as 30% or 20% of the maximum electric power transferable to said vehicle. Thus, it is well possible to change to a Pulse Width Modulation control scheme at higher currents where the current ripple resulting from such control will during the main part of a time period not pass zero so that the noise created by harmonics may in any way not be reduced by preventing the current from passing zero and making it discontinuous.

According to another embodiment of the invention the speed of said vehicle is measured and said first control scheme is used for controlling the semiconductor devices of the line converter only when the speed of the vehicle is below a predetermined level, such as 20 km/h, 10 km/h or 5 km/h. When the speed of the vehicle has such a low level the current through the line converter will also normally be so low that said first control scheme will efficiently reduce creation of disturbing noise resulting from the control of the line converter, which makes the speed of the vehicle as a suitable parameter for deciding which control scheme is to be used.

According to another embodiment of the invention the time $T_1$ the semiconductor device of a current valve is kept conducting once turned on for said first control scheme is calculated by using the following formula when electric power is fed from the AC supply line by the line converter to the DC intermediate link:

$$T_1 = \sqrt{\frac{2 \cdot T_p \cdot L \cdot (U_d - u)}{U_d \cdot u}} \cdot \sqrt{I_{ref}}$$

in which
$T_1$=time of conducting of semiconductor device
$T_p$=period time of switching
$U_d$=DC intermediate link voltage
u=AC line voltage transformed to the secondary side, absolute value
$I_{ref}$=current reference absolute value
L=inductance of transformer The use of this control scheme results in a correct mean value of the current pulses through the secondary winding of the transformer when the current is discontinuous and electric power is fed from the line converter to the DC intermediate link. In the criteria for power flow direction used in this disclosure it is not the instantaneous power flow but the average power, evaluated over e. g. a period or a half period of the fundamental of the AC supply voltage, that is relevant.

According to another embodiment of the invention the time $T_1$ the semiconductor device of a current valve is kept conducting once turned on for said first control scheme is calculated by using the following formula when electric power is fed from the DC intermediate link by the line converter to the AC supply line:

$$T_1 = \sqrt{\frac{2 \cdot T_p \cdot L \cdot u}{U_d \cdot (U_d - u)}} \cdot \sqrt{I_{ref}}$$

in which
$T_1$=time of conducting of semiconductor device
$T_p$=period time of switching
$U_d$=DC intermediate link voltage
u=AC line voltage transformed to the secondary side, absolute value
$I_{ref}$=current reference absolute value
L=inductance of transformer The use of this control scheme results in a correct mean value of the current pulses through the secondary winding of the transformer when the current is discontinuous and the line converter feeds electric power from the DC intermediate link to the AC supply line for regenerating electric power when braking the vehicle.

According to another embodiment of the invention the method comprises a second control scheme in the form of a normal Pulse Width Modulation including a continuous current flowing through said secondary winding of the transformer, and it is shifted from said first control scheme to said second control scheme when the electric power transferred from the AC supply line to said vehicle exceeds a certain percentage of the maximum electric power transferable from said AC supply line to the vehicle, such as 20% or 30% thereof. Thus, although it will be possible to use said first control scheme independently of the magnitude of the electric power transferred from the AC supply line to the vehicle it may be advantageous to shift to normal Pulse Width Modulation at higher loads where the first control scheme makes no substantial sense, since the current ripple will not reach zero other when short before and after the fundamental voltage and current change direction.

According to another embodiment of the invention the time of conducting $T_1$ of the semiconductor device of each current valve for said second control scheme is calculated by using the following formula when electric power is fed from the AC supply line by the line converter to the DC intermediate link:

$$T_1 = \frac{L}{U_d} \cdot (I_{ref} - I) - \frac{T_p}{U_d} \cdot u + T_p$$

in which
$T_1$=time of conducting of semiconductor device
$T_p$=period time of switching
$U_d$=DC intermediate link voltage
$I_{ref}$=current reference absolute value
I=current absolute value
L=inductance of transformer
u=AC line voltage transformed to the secondary side, absolute value.

According to another embodiment of the invention the time of conducting $T_1$ of the semiconductor device of each current valve for said second control scheme is calculated by using the following formula when electric power is fed from the DC intermediate link by the line converter to the AC supply line:

$$T_1 = \frac{L}{U_d} \cdot (I_{ref} - I) + \frac{T_p}{U_d} \cdot u$$

in which
$T_1$=time of conducting of semiconductor device
$T_p$=period time of switching
$U_d$=DC intermediate link voltage
$I_{ref}$=current reference absolute value I=current absolute value
L=inductance of transformer
u=AC line voltage transformed to the secondary side, absolute value.

According to another embodiment of the invention $T_1$ is calculated according to the first and second control scheme in parallel, the two values of $T_1$ so obtained are compared and the control scheme associated with the formula resulting in the lowest value of $T_1$ is selected for the control of the semiconductor device of each current valve. This means that a shifting from the first to the second control scheme and in the opposite direction will take place automatically and that the control according to the first control scheme may be used also only during parts of a period where the current may be made discontinuous by preventing it from pass zero.

According to another embodiment of the invention only the semiconductor device of one current valve of each phase-leg is turned on at a time during said first control scheme. Such a control may result in a discontinuous current at low current levels.

According to another embodiment of the invention when electric power is fed from the AC supply line through said line converter to said DC intermediate link said first control scheme is carried out by keeping all but one of the semiconductor devices turned off and during a first half period of the AC line voltage turning on and off only either in a first of said phase-legs the semiconductor device of the current valve connected to a first of said poles of said DC intermediate link or in a second of said phase-legs the semiconductor device of the current valve connected to a second of said poles and correspondingly during the other half period of the AC line voltage turning on and off only either in said first phase-leg the semiconductor device connected to said second pole or in said second phase-leg the semiconductor device connected to said first pole.

According to another embodiment of the invention when electric power is fed from the AC supply line through said line converter to said DC intermediate link said first control scheme is carried out by either turning on and off the semiconductor devices of the two current valves connected to a first of said poles of the DC intermediate link simultaneously during the same pulse period or, alternatively, turning on and off the semiconductor devices of the two current valves connected to a second pole of said DC intermediate link simultaneously during the same pulse period. This simplified embodiment of the first control scheme may be used only when the current is controlled in phase with the voltage, i.e. during motor operation. When the semiconductor devices are turned on the secondary of the transformer will be short-circuited and the current in the transformer will grow. When the semiconductors are turned off the current will continue to flow through the diodes to a capacitor of the DC intermediate link owing to the inductance (see L in FIG. 2) of the transformer. This embodiment of the first control scheme has the advantage that it is not necessary to be aware of when the fundamental voltage passes zero and changes direction.

According to another embodiment of the invention constituting a further development of the embodiment last mentioned the semiconductor devices of the current valves connected to said first pole and said second pole of the DC intermediate link are alternately turned on. This will result in uniform dissipation and, thus, uniform chip temperature for all semiconductor devices.

According to another embodiment of the invention when electric power is fed from said DC intermediate link through said line converter to the AC supply line, such as when the vehicle is braking, the first control scheme is carried out by, during a first half period of the AC line voltage, in a first of said phase-legs keeping the semiconductor device connected to a first of said poles of said DC intermediate link continuously turned on and in a second of said phase-legs turning on and off the semiconductor device connected to a second of said poles of the DC intermediate link to conduct in pulses and correspondingly during the next half period of the AC supply line voltage by in said second phase leg keeping the semiconductor device of the current valve connected to said first pole continuously turned on and in said first phase-leg turning on and off the semiconductor device connected to said second pole to conduct in pulses.

The invention also relates to a computer program having the features of appended claim 16, a computer program product with the features of claim 17, an electronic control unit of a track-bound vehicle according to claim 18 and a track-bound vehicle according to claim 19.

Further advantages as well as advantageous features of the invention will appear from the following description of embodiments of the invention.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 4A:
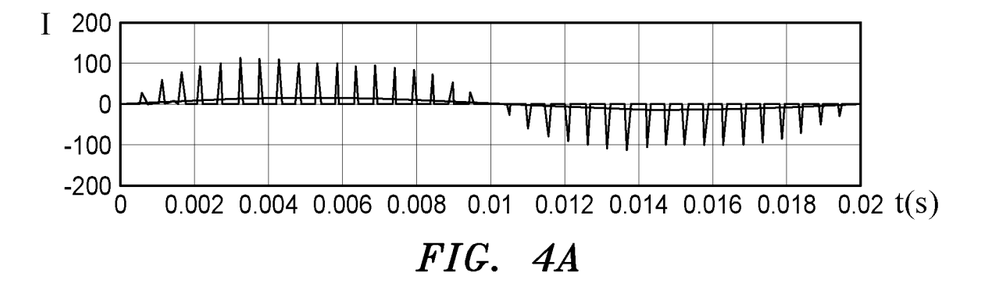
FIGS. 4a and 4b are graphs corresponding to those of FIGS. 3a and 3b resulting when controlling the line converter through a method according to an embodiment of the present invention but at a comparatively low fundamental current value.
Figure 4B:
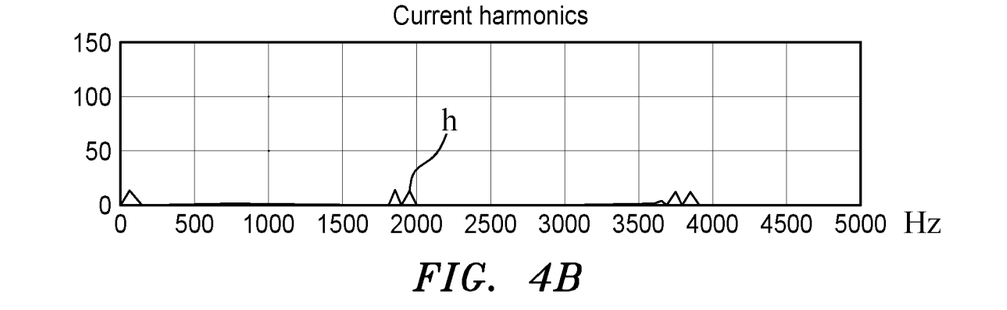

We assume that the line converter shown in FIG. 2 is controlled through the control unit 16 by applying a first control scheme comprising an algorithm for calculating the time $T_1$ the semiconductor device of a current valve is kept conducting once turned on, and that $T_1$ is calculated according to 1) when electric power is fed from the AC supply line by the line converter to the DC intermediate link and according to 2) when electric power is fed from the DC intermediate link by the line converter to the AC supply line:

$$T_1 = \sqrt{\frac{2 \cdot T_p \cdot L \cdot (U_d - u)}{U_d \cdot u}} \cdot \sqrt{I_{ref}} \quad 1)$$

$$T_1 = \sqrt{\frac{2 \cdot T_p \cdot L \cdot u}{U_d \cdot (U_d - u)}} \cdot \sqrt{I_{ref}} \quad 2)$$

in which
$T_1$=time of conducting of semiconductor device
$T_p$=period time of switching
$U_d$=DC intermediate link voltage
u=AC line voltage absolute value
$I_{ref}$=current reference absolute value
L=inductance of transformer The current will then in the case of a low load during one half period be discontinuous and positive and during the next half period discontinuous and negative as shown in FIG. 4a. The current harmonics shown in FIG. 4b will then result, and it is seen that the disturbing harmonics around 1800 Hz are substantially weaker than in the case of a Pulse Width Modulation control as shown in FIG. 3b. The lower the current the higher the degree of reduction of said harmonics when using the first control scheme according to the present invention.

Figure 5A:
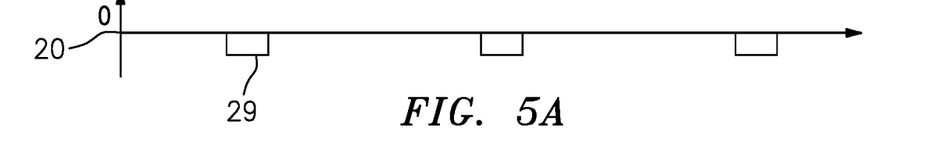
FIGS. 5a and 5b illustrate the control of the current valves of the line converter in FIG. 2 when controlling the line converter according to a said first control scheme and when electric power is fed from the AC supply line by the line converter to the DC intermediate link, i. e. in normal motor operation, for a positive half period of voltage and current.
Figure 5B:
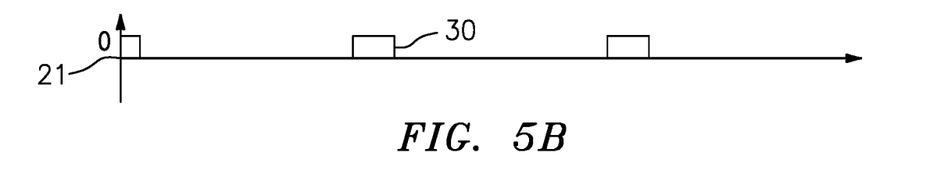
Figure 5C:
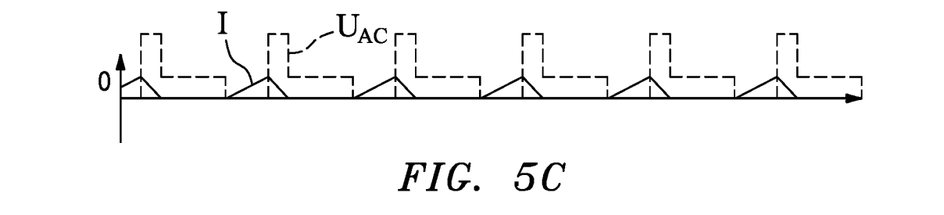
FIG. 5c illustrates the discontinuous current resulting from this control, FIGS. 6a, 6b and 6c correspond to FIGS. 5a, 5b and 5c but for a negative half period of the current, FIGS. 7a-7c and 8a-8c correspond to the FIGS. 5a-5c and 6a-6c, respectively, when electric power is fed from the DC intermediate link by the line converter to the AC supply line, i. e. for generator operation.

FIGS. 5a-5c relate to the use of said first control scheme for motor operation and the case of a positive half period. FIGS. 5a and 5b show the control orders to the semiconductors of a first and a second phase leg, respectively. A control order=0, i. e. with a value on the time axis, means that none of the semiconductors is turned on. A positive control order, i. e. with a value above the time axis, means that the semiconductor connected to the positive pole of the intermediate link is turned on and the other semiconductor is off. A negative control order, i. e. with a value below the time axis, means that the semiconductor connected to the negative pole of the intermediate link is turned on and the other semiconductor is off. It is seen that only the lower semiconductor device 29 of the first phase-leg 20 and the upper semiconductor device 30 of the second phase-leg 21 are turned on, which results in a prevention of the current I (FIG. 5c) to be negative.

Figure 6A:
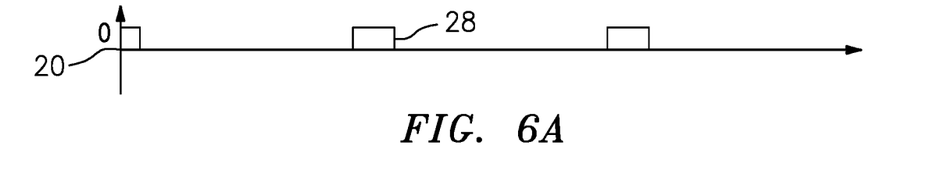
Figure 6B:
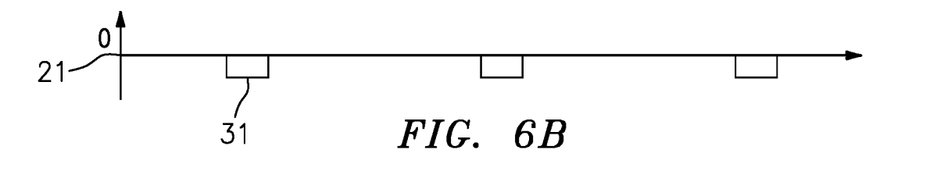
Figure 6C:
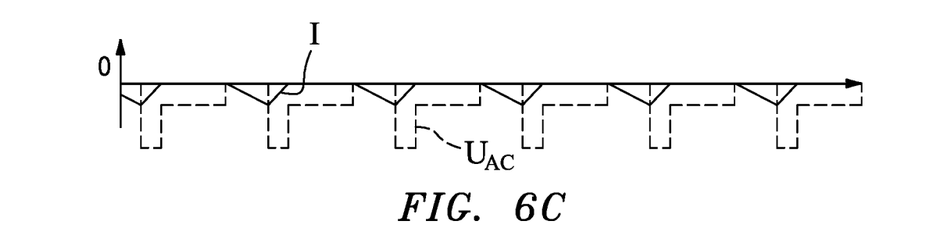

FIGS. 6a-6c show the control during the negative half period for motor operation, in which only the upper semiconductor device 28 of the first phase-leg 20 and the lower semiconductor device 31 of the second phase-leg 21 are turned on.

Figure 8A:
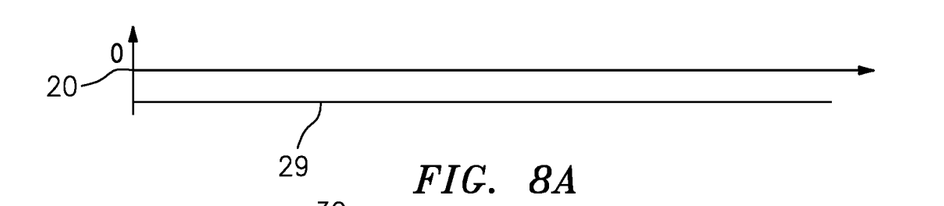
Figure 8B:
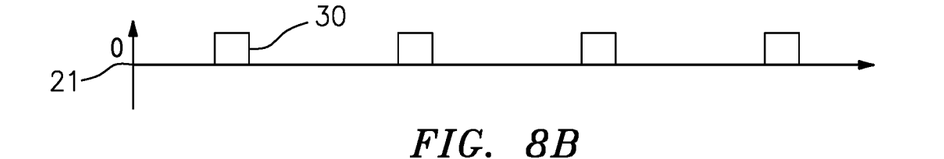

FIGS. 8a and 8b illustrate how the first control scheme is carried out for generator operation of the line converter according to FIG. 2 during a negative half period of the voltage. The lower semiconductor device 29 of the first phase-leg 20 is kept continuously turned on and the upper semiconductor device 30 of the second phase-leg 21 is alternately turned on and turned off. This prevents the current I (see FIG. 8c) from turning negative, so it will be discontinuous in the case of a low load current.

Figure 7A:
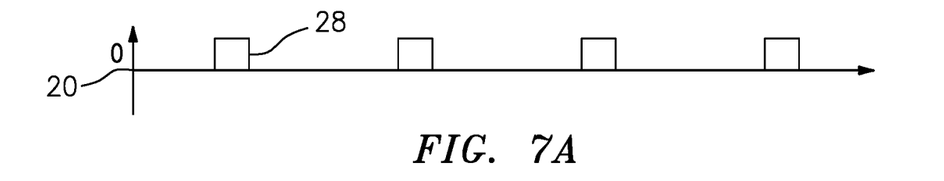
Figure 7B:
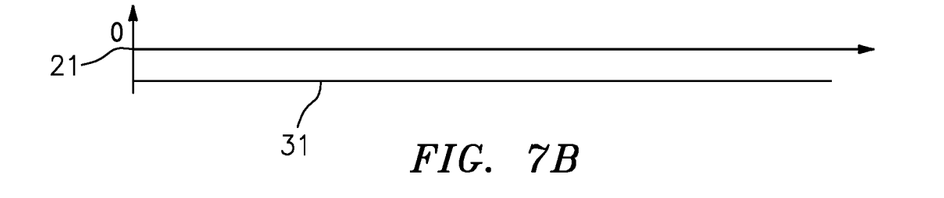
Figure 7C:
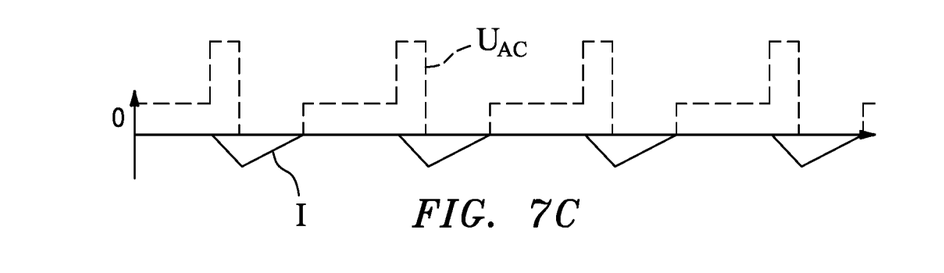
Figure 8C:
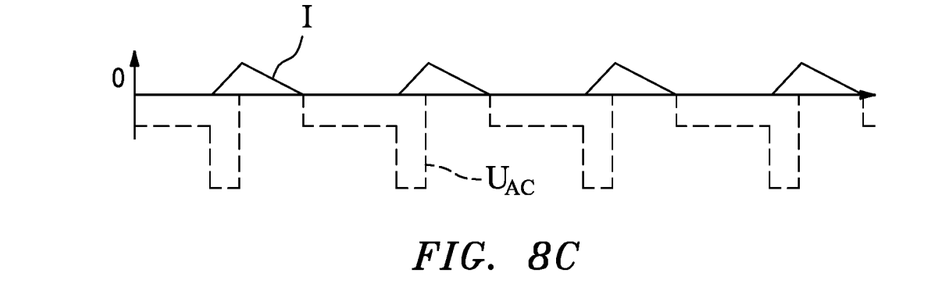

FIGS. 7a-7c are used corresponding to FIGS. 8a-8c for generator operation during a positive half period of the voltage, in which the lower semiconductor device 31 of the second phase-leg 21 is continuously turned-on and the upper semiconductor device 28 of the first phase-leg 20 is alternately turned on and turned off, which results in a prevention of the current I through the secondary winding of the transformer to be positive, so that it will be discontinuous in the case of a low load current.

Figure 9:
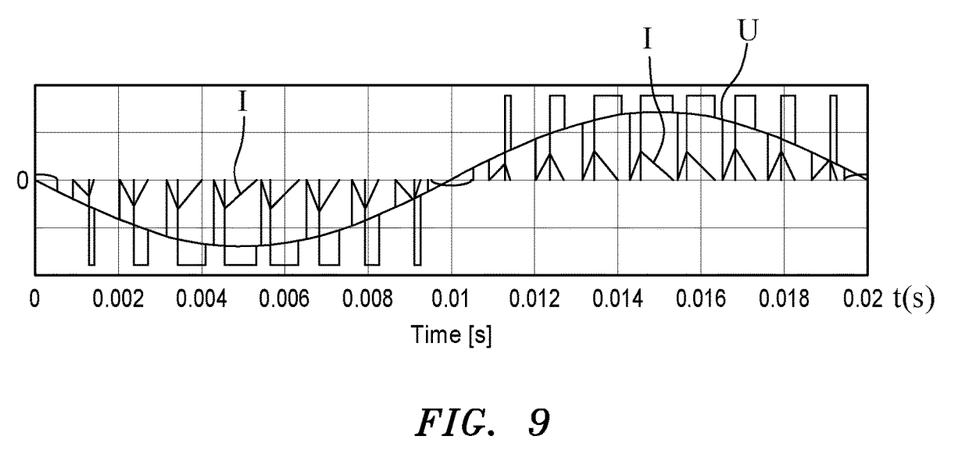
FIG. 9 is a graph of the current through the secondary winding of the transformer of the line converter in FIG. 2 during a time period of the voltage of the AC supply line when carrying out a control according to a simplified embodiment of said first control scheme.

FIG. 9 illustrates a development of the current through the secondary winding of the transformer through which the line converter according to FIG. 2 is connected when controlling the line converter according to a simplified embodiment of said first control scheme at low current operation, in which alternately the two upper semiconductor devices 28, 30 of the two phase-legs and the two lower semiconductor devices 29, 31 of the two phase-legs are turned on and off. This control scheme may only be carried out when the current is controlled in phase with the voltage, i.e. during motor operation. It will then not be necessary to know when the voltage passes zero and a new half period begins for obtaining a discontinuous current for low current operation of the line converter as illustrated for the current I in FIG. 9.

Figure 10:
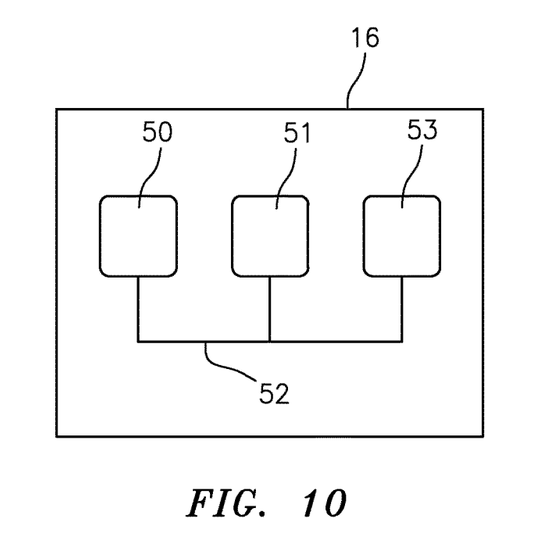
FIG. 10 is a schematic view illustrating an electronic control unit for implementing a method according to the invention.

Computer program code for implementing a method according to the invention is with advantage included in a computer program which can be read into the internal memory of a computer, e.g. the internal memory of an electronic control unit of a track-bound vehicle. Such a computer program is with advantage provided via a computer program product comprising a data storage medium which can be read by a computer and which has the computer program stored on it. FIG. 10 illustrates very schematically an electronic control unit 16 comprising an execution means 50, e.g. a central processor unit (CPU) for execution of computer software. The execution means 50 communicates with the memory 51, e.g. of the RAM type, via a data buss 52. The control unit 16 comprises also a non-transitory data storage medium 53, e.g. in the form of a flash memory or a memory of the ROM, PROM, EPROM or EEPROM type. The execution means 50 communicates with the data storage medium 53 via the data buss 52. The computer program comprises computer program code for implementing a method according to the invention, e.g. in accordance with the embodiments disclosed above is stored on the data storage medium 53.

The invention is of course in no way restricted to the embodiments described above, since many possibilities for modifications thereof are likely to be obvious to one skilled in the art without having to deviate from the scope of invention defined in the appended claims.

The method according to the invention may be applied to a line converter having more than one bridge, such as for example six bridges connected to one and the same transformer. Each current valve of the converter may have a plurality of semiconductor devices connected in series and controlled simultaneously as one single semiconductor device. The rectifying members shown in the line converter above may also stand for a plurality of rectifying members connected in series.

The invention claimed is:
1. A method for controlling a line converter (12) on board a track-bound vehicle (1), said converter having at least one bridge with two phase-legs (20, 21) connected in parallel between opposite poles (22, 23) of a DC intermediate link (60) and having each at least two current valves (24-27) connected in series, each said current valve comprising a semiconductor device (28-31) of turn-off type and a rectifying member (32-35) connected in anti-parallel therewith, a midpoint (36, 37) of each phase-leg dividing the phase-leg in two identical halves being connected to an opposite side of a secondary winding (4) of a transformer with respect to a said midpoint of the other phase-leg, said transformer having a primary winding (40) connected to an AC supply line (2) for track-bound vehicles, comprising
controlling said semiconductor devices (28-31) to be turned on and off to prevent the current (I) through said secondary winding (4) of the transformer to pass zero and shift direction until the voltage across said primary winding (40) shifts direction by a start of a new half period of the AC line voltage across the windings of the transformer (3),
activating a first control scheme according to which said semiconductor devices (28-31) are controlled so that when a current through the secondary winding (4) of the transformer having a certain direction reaches zero, it will remain zero until starting to flow in the same certain direction again during one and the same half period of said AC line voltage and accordingly be discontinuous,
measuring speed of said vehicle (1) and operating said first control scheme for controlling the semiconductor devices (28-31) of the line converter (12) when the vehicle is idling and standing still.

2. The method according to claim 1, comprising a second control scheme in the form of a normal Pulse Width Modulation including a continuous current flowing through said secondary winding (4) of the transformer (3), and shifting from said first control scheme to said second control scheme when the electric power transferred from the AC supply line (2) to said vehicle (1) exceeds a certain percentage of the maximum electric power transferable from said AC supply line to the vehicle.

3. The method according to claim 1, wherein during said first control scheme only a semiconductor device (28-31) of one current valve (24-27) of each phase-leg is turned on at a time.

4. A computer program comprising computer program code for bringing a computer to implement a method according to claim 1 when the computer program code is executed in the computer.

5. A computer program product comprising a non-transitory data storing medium readable by a computer, in which the computer program code of a computer program according to claim 4 is stored on the data storing medium.

6. An electronic control unit (12) of a track-bound vehicle comprising an execution means (50), a memory (51) connected to the execution means and a non-transitory data storing medium (53) connected to the execution means (50), in which the computer program code of a computer program according to claim 4 is stored on said data storing medium (53).

7. A track-bound vehicle comprising an electronic control unit (12) according to claim 6.

8. A method for controlling a line converter (12) on board a track-bound vehicle (1), said converter having at least one bridge with two phase-legs (20, 21) connected in parallel between opposite poles (22, 23) of a DC intermediate link (60) and having each at least two current valves (24-27) connected in series, each said current valve comprising a semiconductor device (28-31) of turn-off type and a rectifying member (32-35) connected in anti-parallel therewith, a midpoint (36, 37) of each phase-leg dividing the phase-leg in two identical halves being connected to an opposite side of a secondary winding (4) of a transformer with respect to a said midpoint of the other phase-leg, said transformer having a primary winding (40) connected to an AC supply line (2) for track-bound vehicles, comprising
controlling said semiconductor devices (28-31) to be turned on and off to prevent the current (I) through said secondary winding (4) of the transformer to pass zero and shift direction until the voltage across said primary winding (40) shifts direction by a start of a new half period of the AC line voltage across the windings of the transformer (3), and
activating a first control scheme according to which said semiconductor devices (28-31) are controlled so that when a current through the secondary winding (4) of the transformer having a certain direction reaches zero, it will remain zero until starting to flow in the same certain direction again during one and the same half period of said AC line voltage and accordingly be discontinuous, wherein
the time (T1) the semiconductor device (28-31) of a current valve (24-27) is kept conducting once turned on for said first control scheme is calculated by using the following formula when electric power is fed from the AC supply line by the line converter to the DC intermediate link $$T_1 = \sqrt{\frac{2 \cdot T_p \cdot L \cdot (U_d - u)}{U_d \cdot u}} \cdot \sqrt{I_{ref}}$$

in which
T1=time of conducting of semiconductor device
Tp=period time of switching
Ud=DC intermediate link voltage
u=AC line voltage transformed to the secondary side, absolute value
Iref=current reference absolute value
L=inductance of transformer and/or
the time (T1) the semiconductor device (28-31) of a current valve (24-27) is kept conducting once turned on for said first control scheme is calculated by using the following formula when electric power is fed from the DC intermediate link by the line converter to the AC supply line $$T_1 = \sqrt{\frac{2 \cdot T_p \cdot L \cdot u}{U_d \cdot (U_d - u)}} \cdot \sqrt{I_{ref}}$$

in which
T1=time of conducting of semiconductor device
Tp=period time of switching
Ud=DC intermediate link voltage
u=AC line voltage transformed to the secondary side, absolute value
Iref=current reference absolute value
L=inductance of transformer, and/or when electric power is fed from the AC supply line through said line converter to said DC intermediate link, said first control scheme is carried out by keeping all but one of the semiconductor devices (28-31) turned off and during a first half period of the AC line voltage turning on and off, only either in a first (20) of said phase-legs the semiconductor device (28) of the current valve (24) connected to a first (22) of said poles of said DC intermediate link (60) or in a second (21) of said phase-legs the semiconductor device (31) of the current valve (27) connected to a second (23) of said poles and correspondingly during the other half period of the AC line voltage, turning on and off only either in said first (20) phase-leg the semiconductor device (29) connected to said second pole (23) or in said second (21) phase-leg the semiconductor device (30) connected to said first pole (22), and/or when electric power is fed from the AC supply line through said line converter to said DC intermediate link, said first control scheme is carried out by either turning on the semiconductor devices (28, 30) of the two current valves (24, 26) connected to a first (22) of said poles of the DC intermediate link (60) to be conducting during the same pulse period or turning on the semiconductor devices (29, 31) of the two current valves (25, 27) connected to a second pole (23) of said DC intermediate link (60) to be conducting during the same pulse period.

9. The method according to claim 8, wherein the semiconductor devices of the current valves connected to said first pole (22) and said second pole (23) of the DC intermediate link are alternately turned on.

10. A method for controlling a line converter (12) on board a track-bound vehicle (1), said converter having at least one bridge with two phase-legs (20, 21) connected in parallel between opposite poles (22, 23) of a DC intermediate link (60) and having each at least two current valves (24-27) connected in series, each said current valve comprising a semiconductor device (28-31) of turn-off type and a rectifying member (32-35) connected in anti-parallel therewith, a midpoint (36, 37) of each phase-leg dividing the phase-leg in two identical halves being connected to an opposite side of a secondary winding (4) of a transformer with respect to a said midpoint of the other phase-leg, said transformer having a primary winding (40) connected to an AC supply line (2) for track-bound vehicles, comprising controlling said semiconductor devices (28-31) to be turned on and off to prevent the current (I) through said secondary winding (4) of the transformer to pass zero and shift direction until the voltage across said primary winding (40) shifts direction by a start of a new half period of the AC line voltage across the windings of the transformer (3), activating a first control scheme according to which said semiconductor devices (28-31) are controlled so that when a current through the secondary winding (4) of the transformer having a certain direction reaches zero, it will remain zero until starting to flow in the same certain direction again during one and the same half period of said AC line voltage and accordingly be discontinuous, and activating a second control scheme in the form of a normal Pulse Width Modulation including a continuous current flowing through said secondary winding (4) of the transformer (3), and shifting from said first control scheme to said second control scheme when the electric power transferred from the AC supply line (2) to said vehicle (1) exceeds a certain percentage of the maximum electric power transferable from said AC supply line to the vehicle, wherein the time of conducting (T1) of the semiconductor device (28-31) of each current valve (24-27) for said second control scheme is calculated by using the following formula when electric power is fed from the AC supply line by the line converter to the DC intermediate link:

$$T_1 = \frac{L}{U_d} \cdot (I_{ref} - I) - \frac{T_p}{U_d} \cdot u + T_p$$

in which
T1=time of conducting of semiconductor device
Tp=period time of switching
Ud=DC intermediate link voltage
Iref=current reference absolute value
I=current absolute value
L=inductance of transformer
u=AC line voltage transformed to the secondary side, absolute value, and/or the time of conducting (T1) of the semiconductor device (28-31) of each current valve (24-27) for said second control scheme is calculated by using the following formula when electric power is fed from the DC intermediate link by the line converter to the AC supply line:

$$T_1 = \frac{L}{U_d} \cdot (I_{ref} - I) + \frac{T_p}{U_d} \cdot u$$

in which
T1=time of conducting of semiconductor device
Tp=period time of switching
Ud=DC intermediate link voltage
Iref=current reference absolute value
I=current absolute value
L=inductance of transformer
u=AC line voltage transformed to the secondary side, absolute value.

11. The method according to claim 10, wherein (T1) is calculated according to the first and second control scheme in parallel, the two values of (T1) so obtained are compared and the control scheme associated with the formula resulting in the lowest value of (T1) is selected for the control of the semiconductor device (28-31) of each current valve (24-27).

12. A method controlling a line converter (12) on board a track-bound vehicle (1), said converter having at least one bridge with two phase-legs (20, 21) connected in parallel between opposite poles (22, 23) of a DC intermediate link (60) and having each at least two current valves (24-27) connected in series, each said current valve comprising a semiconductor device (28-31) of turn-off type and a rectifying member (32-35) connected in anti-parallel therewith, a midpoint (36, 37) of each phase-leg dividing the phase-leg in two identical halves being connected to an opposite side of a secondary winding (4) of a transformer with respect to a said midpoint of the other phase-leg, said transformer having a primary winding (40) connected to an AC supply line (2) for track-bound vehicles, comprising controlling said semiconductor devices (28-31) to be turned on and off to prevent the current (I) through said secondary winding (4) of the transformer to pass zero and shift direction until the voltage across said primary winding (40) shifts direction by a start of a new half period of the AC line voltage across the windings of the transformer (3), and activating a first control scheme according to which said semiconductor devices (28-31) are controlled so that when a current through the secondary winding (4) of the transformer having a certain direction reaches zero, it will remain zero until starting to flow in the same certain direction again during one and the same half period of said AC line voltage and accordingly be discontinuous when said vehicle is idling and standing still, wherein when electric power is fed from said DC intermediate link through said line converter to the AC supply line, the first control scheme is carried out by, during a first half period of the AC line voltage, in a first (20) of said phase-legs keeping a semiconductor device (28) connected to a first (22) of said poles of said DC intermediate link (60) continuously turned on and in a second (21) of said phase-legs turning on and off the semiconductor device (31) connected to a second of said poles (23) of the DC intermediate link (60) to conduct in pulses and, correspondingly during the next half period of the AC supply line voltage, in said second phase-leg (21) keeping the semiconductor device (30) of the current valve (26) connected to said first pole (22) continuously turned on and in said first phase-leg (20) turning on and off the semiconductor device (29) connected to said second pole (23) to conduct in pulses.

* * * * *